US010648636B2

(12) United States Patent
Chen et al.

(10) Patent No.: US 10,648,636 B2
(45) Date of Patent: May 12, 2020

(54) LED HEADLAMP PROJECTION LIGHTING DEVICE

(71) Applicant: Lumileds Holding B.V., Schiphol (NL)

(72) Inventors: Felix Chen, Shanghai (CN); Ping Wu, Shanghai (CN); Meng Han, Shanghai (CN)

(73) Assignee: Lumileds Holding B.V., Schiphol (NL)

(*) Notice: Subject to any disclaimer, the term of this patent is extended or adjusted under 35 U.S.C. 154(b) by 49 days.

(21) Appl. No.: 15/761,609

(22) PCT Filed: Sep. 20, 2016

(86) PCT No.: PCT/EP2016/072274
§ 371 (c)(1),
(2) Date: Mar. 20, 2018

(87) PCT Pub. No.: WO2017/050746
PCT Pub. Date: Mar. 30, 2017

(65) Prior Publication Data

US 2018/0347777 A1 Dec. 6, 2018

(30) Foreign Application Priority Data

Sep. 22, 2015 (WO) ................ PCT/CN2015/090231
Oct. 20, 2015 (EP) .................................... 15190520

(51) Int. Cl.
*B60Q 1/00* (2006.01)
*F21S 41/43* (2018.01)
(Continued)

(52) U.S. Cl.
CPC ............. *F21S 41/43* (2018.01); *F21S 41/147* (2018.01); *F21S 41/25* (2018.01); *F21S 41/255* (2018.01);
(Continued)

(58) Field of Classification Search
CPC .......... F21S 41/43; F21S 41/25; F21S 41/147; F21S 41/32; F21S 45/48
See application file for complete search history.

(56) References Cited

U.S. PATENT DOCUMENTS

| | | | | |
|---|---|---|---|---|
| 2009/0257240 A1 | 10/2009 | Koike | | |
| 2010/0309680 A1 | 12/2010 | Akutagawa et al. | | |
| 2012/0039083 A1* | 2/2012 | Meyrenaud ............. | F21S 41/36 362/516 | |

FOREIGN PATENT DOCUMENTS

| | | |
|---|---|---|
| EP | 1705422 A1 | 9/2006 |
| JP | 2008288113 A | 11/2008 |
| KR | 20150068117 A | 6/2015 |

OTHER PUBLICATIONS

EPO as ISA, "International Search Report and Written Opinion" dated Nov. 23, 2016 from International Application No. PCT/EP2016/072274, filed Sep. 20, 2016, 12 pages.

(Continued)

*Primary Examiner* — Anabel Ton

(57) ABSTRACT

A lighting device includes an LED light source and a concave reflector. The light source is arranged such that light emitted is reflected by the reflector. The shield is arranged in front of the reflector. A projection lens is arranged to project light passing the shield. In order to efficiently use light emitted from the LED light source and to enable a projected illumination beam of high luminous flux, the LED light source is arranged below an optical axis L of the projection lens.

13 Claims, 3 Drawing Sheets

(51) Int. Cl.

| | |
|---|---|
| ***F21S 41/147*** | (2018.01) |
| ***F21S 41/255*** | (2018.01) |
| ***F21S 41/32*** | (2018.01) |
| ***F21S 41/25*** | (2018.01) |
| ***F21S 45/48*** | (2018.01) |

(52) U.S. Cl.

CPC ............ *F21S 41/32* (2018.01); *F21S 41/321* (2018.01); *F21S 45/48* (2018.01)

(56) References Cited

OTHER PUBLICATIONS

Extended European Search Report dated Mar. 31, 2016 from European Patent Application No. 15190520.5 filed Oct. 20, 2015, 6 pages.
CN. App No. 201680055209.5, "First Office Action," dated Mar. 3, 2020, 10 pages.

* cited by examiner

LED HEADLAMP PROJECTION LIGHTING DEVICE

CROSS-REFERENCE TO RELATED APPLICATIONS

The present application is a § 371 application of International Application No. PCT/EP2016/072274 filed on Sep. 20, 2016 and titled "LED HEADLAMP PROJECTION LIGHTING DEVICE," which claims the benefit of International Application No. PCT/CN2015/090231 filed on Sep. 22, 2015 and European Patent Application No. 15190520.5 filed on Oct. 20, 2015. International Application No. PCT/EP2016/072274, International Application No. PCT/CN2015/090231, and European Patent Application No. 15190520.5 are incorporated herein.

FIELD OF THE INVENTION

The invention relates to a lighting device, in particular to a lighting device including an LED light source, a concave reflector and a projection lens to project light. The invention further relates to a vehicle headlight.

BACKGROUND OF THE INVENTION

Lighting devices including an LED light source and a reflector arranged to reflect light from the LED light source are generally known. In the automotive field, vehicle headlights have been proposed including an LED light source, a concave reflector with a first and second focus, and a shield arranged in front of the reflector. A projection lens may be arranged to project light passing the shield.

US 2009/257240 A1 discloses a vehicle lamp unit with a LED source below the optical axis of a projection lens. Between the LED and the projection lens a shade is provided. The shade is configured as a vertical plate with a top edge.

EP 1 705 422 A1 discloses a vehicle lamp unit with a LED source below the optical axis of a projection lens. Between the LED and the projection lens a shade is provided. The shade is formed with a horizontal plate. The plate has an edge that forms a cutoff line.

SUMMARY OF THE INVENTION

It may be considered an object to propose a lighting device and a vehicle headlight adapted to efficiently use the light emitted from an LED light source to enable a projected illumination beam of high luminous flux.

This object is achieved by a lighting device according to claim 1 and a vehicle headlight according to claim 12. Dependent claims refer to preferred embodiments.

The present inventors have considered lighting devices including an LED light source and a concave reflector and have determined that if the LED light source is arranged on the optical axis of the projection lens, the distribution of light reflected by the reflector may not be efficiently directed at the central portion of the projection lens. In particular, if height restrictions for the projection lens apply, a significant portion of the light reflected by the reflector may not be used to form the projected illumination beam.

In the lighting device and vehicle headlight according to the invention, at least one LED light source is arranged to emit light. The term "LED light source" includes all kinds of single or multiple solid state lighting elements, such as light emitting diodes, organic light emitting diodes (OLED), laser diodes, etc.

A reflector of concave shape is provided such that the LED light source is preferably arranged to be at least partially surrounded by the reflector. The reflector is arranged to reflect light emitted from the LED light source to form an illumination beam. A preferred shape of the reflector is a free-form surface based on a roughly paraboloid shape. Preferably, the reflector may be shaped as a half dome arranged above the LED light source. Particularly preferred is a surface shape obtaining an optical arrangement with a first focus and a second focal region. Light emitted from the first focus is reflected to the second focal region. The LED light source may then be arranged in the first focus of the reflector.

A shield is arranged in front of the reflector. The shield may generally comprise an upper edge to cut off a portion of the light reflected by the reflector to obtain a light/dark boundary in the reflected beam. The corresponding light/dark boundary may be required for different kinds of vehicle illumination, in particular low beam lighting. While the shield may include a horizontal upper edge for creating a horizontal light/dark cutoff, it is preferred to provide the shield with a specially shaped cutoff edge including a first, at least substantially horizontal portion and a second portion which is slightly inclined with respect to the horizontal portion, e. g. 5°-30°.

A projection lens is arranged preferably in front of the shield. Light passing the shield is projected by the projection lens as an illumination beam. To obtain a sharp projection, it is preferred to arrange the projection lens such that at least a portion of the shield is arranged within a focus of the projection lens. Preferably, a center portion of the shield is arranged within the focus of the projection lens. The projection lens comprises an optical axis, which may be defined through at least one focus and/or through the center of the projection lens.

According to the invention, the LED light source is arranged outside of the optical axis of the projection lens. In the usual operating position of the lighting device and vehicle headlight, the LED light source is arranged below the optical axis. It should be noted that reference to directions such as above or below should be understood as referring to the usual operating position and are descriptive rather than limiting, in particular not excluding that the device or headlamp may be rotated, tilted or turned upside down.

An arrangement of the LED light source outside of the optical axis of the projection lens may achieve particularly efficient use of the light emitted from the LED light source and reflected by the reflector, facilitating to direct light to a center portion of the projection lens. Even for a projection lens with limited height, the largest portion of the luminous flux may thus be used to form the illumination beam. Thus, overall an efficient lighting device and vehicle headlamp may be provided with reduced height.

According to a preferred embodiment of the invention, a shield axis may be defined through the LED light source and through the center of the upper edge of the shield, serving to cut off a portion of the light reflected by the reflector. This shield axis of the reflector may be arranged inclined relatively to the optical axis of the projection lens. For example, the optical axis of the projection lens may be arranged at least substantially horizontal, and the shield axis may be arranged upwardly inclined thereto. Preferably, an angle of inclination formed between the shield axis and the optical axis of the projection lens may be 5°-25°, especially preferred 10°-20°.

In one embodiment, the reflector is shaped such that it comprises a first focus and a second focal region. The LED light source is preferably arranged at the first focus, such that light emitted from the LED light source is focused to the second focal region, where preferably the shield is arranged. A reflector axis may be defined through the first focus and at least a portion of said second focal region. The reflector axis may be at least substantially the same as the above defined shield axis. Preferably, the reflector axis is arranged inclined relatively to the optical axis of the projection lens.

According to a preferred embodiment, the LED light source may be arranged on a flat surface. The flat surface may be arranged inclined relatively to the optical axis of the projection lens. For example, the flat surface may be arranged at least substantially in parallel to the shield axis and/or to the reflector axis. In particular for a half dome shaped reflector, it is preferable to arrange the reflector above the flat surface.

In a further preferred embodiment of the invention, the reflector and/or the LED light source may be mounted on a heat sink body. A heat sink may thus not only serve to dissipate heat generated during operation of the LED light source, but may also provide a base for mechanically mounting the LED light source and/or the reflector. Further, the shield and/or the projection lens may be arranged fixed to the heat sink body, such that a very stable and compact unit with a defined relative arrangement of the optical components is formed.

These and other aspects of the invention will become apparent from and elucidated with reference to the embodiments described hereinafter.

DETAILED DESCRIPTION OF EMBODIMENTS

Figure 1:
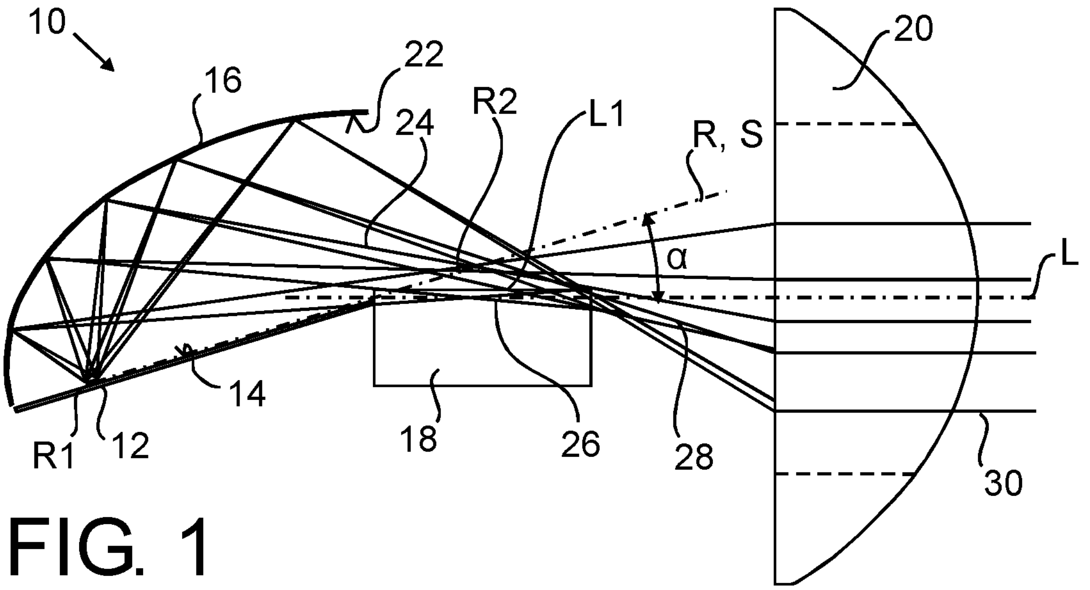
FIG. 1 shows a schematical sectional view of a first embodiment.
Figure 2:
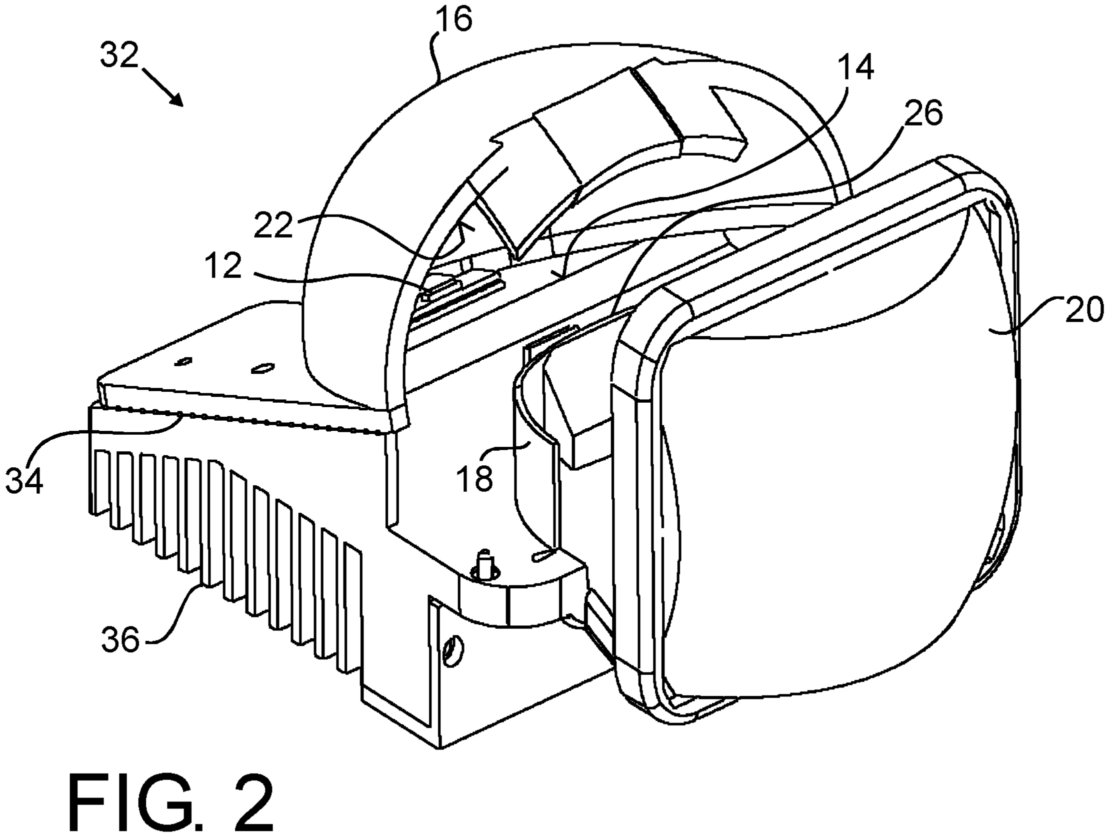
FIG. 2-4 show a perspective view, top view and side view of a second embodiment.
Figure 3:
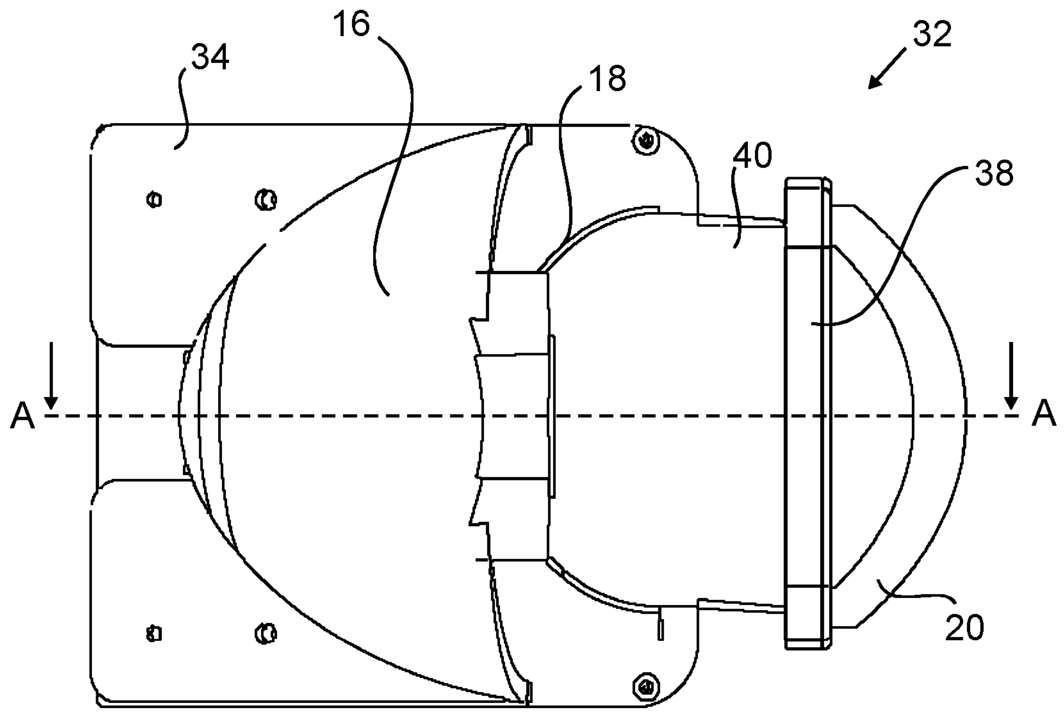
Figure 4:
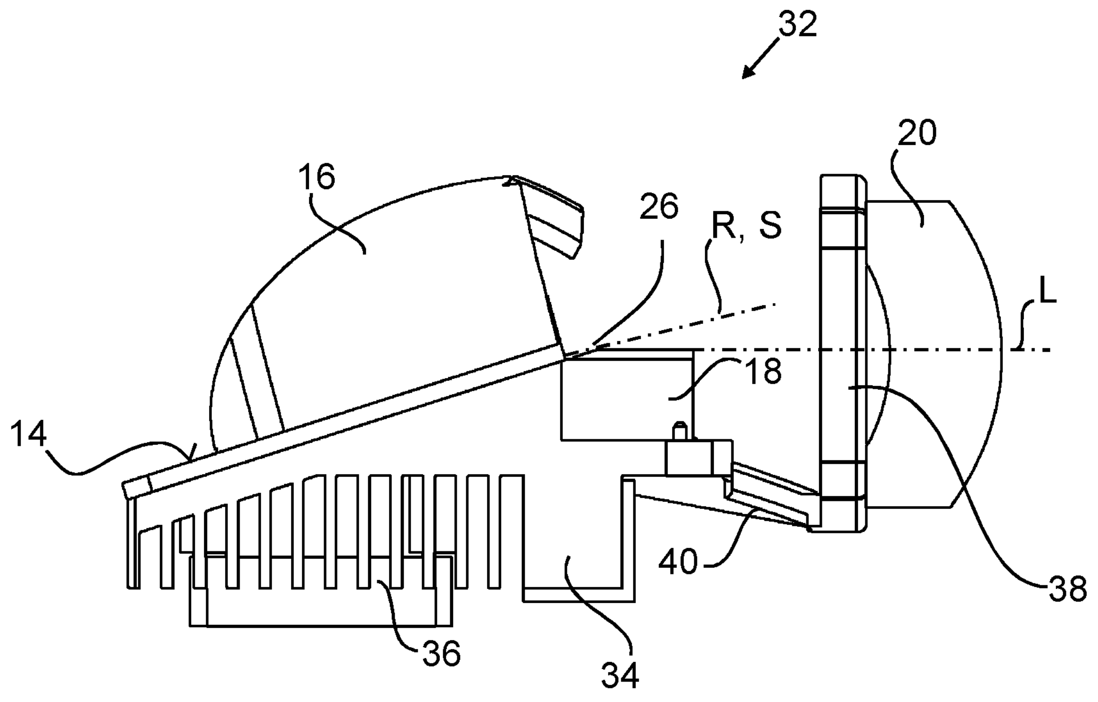
Figure 5:
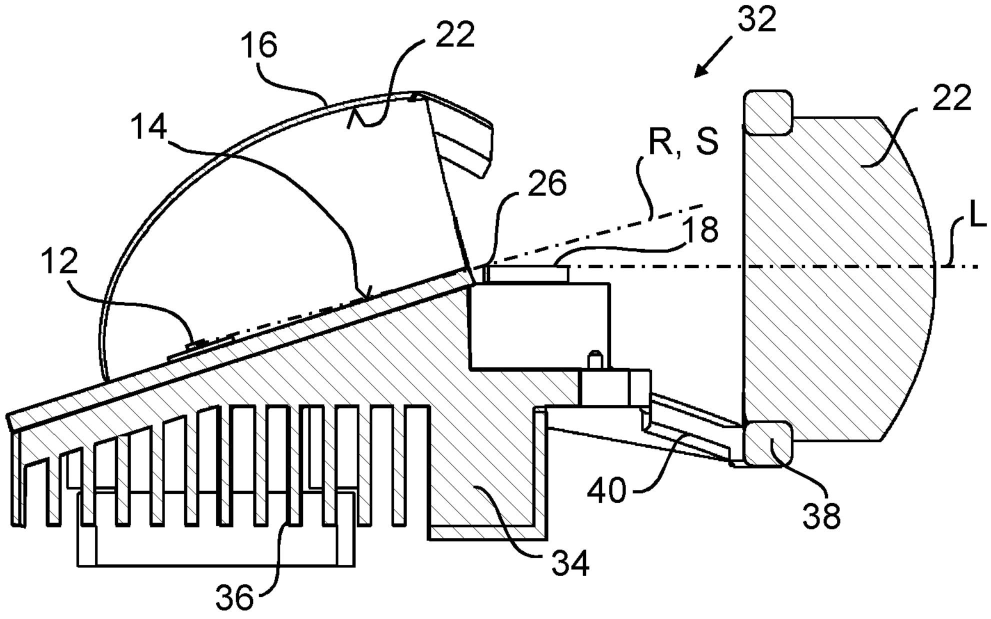
FIG. 5 shows a sectional view of the second embodiment with the section taken along line A. .A in FIG. 3.

FIG. 1 schematically shows a central longitudinal sectional view of a lighting device 10 according to a first embodiment. An LED light source 12 is arranged on a flat surface 14 covered by a half dome shaped reflector 16.

A projection lens 20 is arranged in front of the reflector 16. A shield 18 is arranged between the reflector 16 and the projection lens 20.

The reflector 16 has a first focus R1 and a second focal region R2. An inner reflector surface 22 of the reflector 16 is shaped such that light emitted from the first reflector focus R1 is reflected to the second focal region R2.

The LED light source 12 is arranged within the first reflector focus R1. The shield 18 is arranged within the second focal region R2 of the reflector 16. A reflector axis R may be defined through the first reflector focus R1 and a portion of the focal region R2. The projection lens 20 has a first lens focus L1, defining an optical axis L through the first lens focus L1 and a center of the lens 20. In the preferred operating position as shown in FIG. 1, the optical axis L of the projection lens 20 is at least substantially horizontal.

In the arrangement shown in FIG. 1, the reflector 16 and the flat surface 14 on which the LED light source 12 is mounted are arranged such that the LED light source 12 is arranged a certain distance below the optical axis R of the reflector. A shield axis S may be defined by the center of the LED light source 12 and the center of an upper edge 26 of the shield 18. In the embodiment shown, the shield axis S and the reflector axis R coincide.

Both the the shield axis S and the reflector axis R are inclined relatively to the optical axis L of the projection lens 20. As shown in FIG. 1, the axes R, S and the optical axis L of the projection lens 20 form an angle of inclination a of about 15°. While the optical axis L of the projection lens 20 is arranged horizontally, the axes R, S are upwardly inclined.

In operation of the lighting device 10, the LED light source 12 is operated to emit light. The light emitted from the LED light source 12, positioned at the first focus R1 of the reflector 16, is reflected at the inner reflector surface 22 into the direction of the second focal region R2, creating a reflected beam 24.

The reflected beam 24 is focused onto the upper edge 26 of the shield 18 positioned within the second focal region R2. While a portion of the reflected beam 24 is cut off at the reflector edge 26, a remaining beam portion 28 passes over the shield edge 26 onto the lens 20.

The lens 20 projects the remaining beam portion 28 to form a front illumination beam 30. Due to the arrangement of the center of the shield edge 26 in the focus L1 of the projection lens 20, the illumination beam 30 includes a relatively sharp projected image of the reflector edge 26, thus including a corresponding light/dark cutoff.

As schematically shown in FIG. 1, the inclined arrangement of the reflector 16 leads to a preferred direction of the reflected beam 24 towards the center portion of the projection lens 20. As schematically shown by dashed lines in FIG. 1, the projection lens 20 may be provided with reduced height, while the largest part of the beam 24, 28 may still be projected as the illumination beam 30.

FIGS. 2-5 show a vehicle headlight 32 according to a second embodiment. The vehicle headlight 32 is a more specific embodiment, yet comprises the same basic elements as the lighting device of FIG. 1. In the following, only differences between the embodiments will be further explained. Like reference numerals will be used to refer to like parts.

In the vehicle headlight 32, a heat sink 34 body including cooling fins 36 forms a base of the device. All elements are fixed to the head sink body 34.

The inclined surface 14 is formed on top of the heat sink body 34 and the reflector 16 is mounted on the inclined surface 14. The shield 18 is fixed to a front side of the heat sink body 34. The projection lamp 22 is held in a frame 38 arranged by a holding arm 40 extending from the heat sink body 34.

The optical arrangement of the main components of the vehicle headlight 32, namely the LED light source 12, reflector 16, shield 26 and projection lens 20 is as already explained with regard to the first embodiment (FIG. 1). The axis R of the reflector 16 and the shield axis S are inclined relatively to the optical axis L of the projection lens 20.

Figure 6:
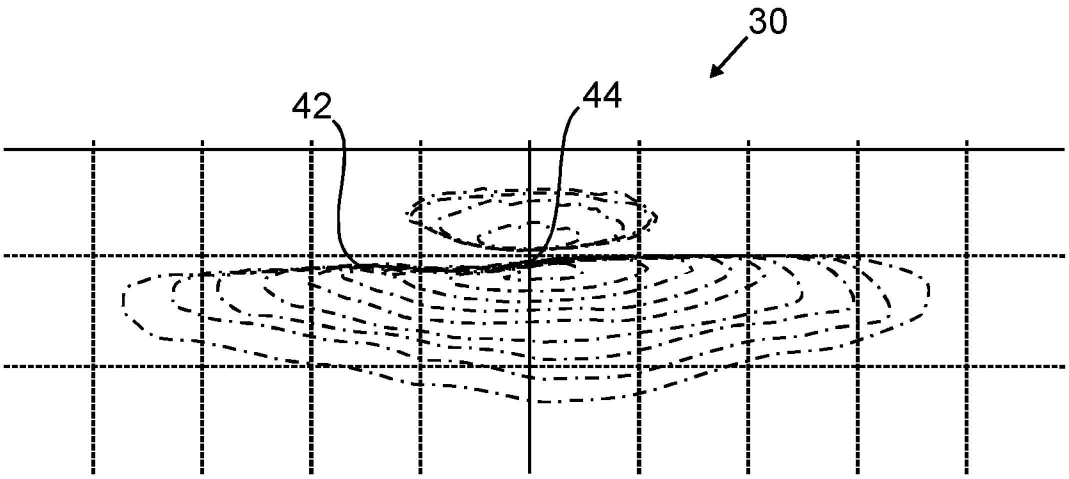
FIG. 6 shows a diagram of a distribution of the luminous flux of an illumination beam of the second embodiment.

FIG. 6 shows a diagram of the luminous flux distribution of the resulting illumination beam 30 projected by the projection lens 20. In accordance with the shape of the top edge 26 of the shield 18, the projected beam 30 includes a horizontal portion 42 and an inclined portion 44.

While the invention has been illustrated and described in detail in the drawings and foregoing description, such illustration and description are to be considered illustrative or exemplary and not restrictive; the invention is not limited to disclosed embodiments.

For example, projected beams 30 with a different distribution may be formed by using a shield 18 with a differently shaped edge 26. Also, the shape of the reflector may differ.

These and other variations from the disclosed embodiments can be understood and effected by those skilled in the art in practicing the claimed invention, from a study of the drawings, the disclosure and the appended claims. In the claims, the word "comprising" does not exclude other elements, and the indefinite article "a" or "an" does not exclude a plurality.

The mere fact that certain measures are recited in mutually different dependent claims does not indicate that a combination of these measures cannot be used to advantage. Any reference signs in the claims should not be construed as limiting the scope.

The invention claimed is:

1. Lighting device, comprising at least
an LED light source,
a concave reflector comprising a reflector axis, said LED light source being arranged to emit light to be reflected by said reflector,
a shield being arranged in front of said reflector,
a projection lens being arranged to project light passing said shield, said projection lens comprising an optical axis,
wherein the reflector axis is inclined relative to the optical axis
wherein said LED light source is arranged below the optical axis,
wherein said shield comprises an upper edge to cut off a portion of said light reflected by said reflector,
wherein the upper edge of the shield is provided with a first portion, which first portion is horizontal in the direction of the optical axis, and a second portion, which second portion is slightly inclined in the direction of the optical axis,
wherein the second portion of the shield is located between the LED light source and the first portion, and
wherein the second portion of the shield is inclined with respect to the horizontal portion with an angle between 5°-30°.

2. Lighting device according to claim 1, wherein
a center of the upper edge of the shield, in the direction of the optical axis, serves to cut off a portion of the light reflected by the reflector,
a shield axis is defined by the LED light source and the center of the upper edge of the shield, and
said shield axis is arranged inclined relatively to said optical axis of said projection lens.

3. Lighting device according to claim 2, wherein
said shield axis is arranged at an angle of 10°-20° relatively to said optical axis of said projection lens.

4. Lighting device, comprising at least
an LED light source,
a concave reflector comprising a reflector axis, said LED light source being arranged to emit light to be reflected by said reflector,
a shield being arranged in front of said reflector,
a projection lens being arranged to project light passing said shield, said projection lens comprising an optical axis,
wherein the reflector axis is inclined relative to the optical axis
wherein said LED light source is arranged below the optical axis,
wherein said shield comprises an upper edge to cut off a portion of said light reflected by said reflector,
wherein the upper edge of the shield is provided with a first portion, which first portion is horizontal in the direction of the optical axis, and a second portion, which second portion is slightly inclined in the direction of the optical axis,
wherein the second portion of the shield is located between the LED light source and the first portion, and
wherein said reflector comprises at least a first focus, said LED light source being arranged at said first focus.

5. Lighting device according to claim 4, wherein
said reflector further comprises at least a second focal region, wherein light emitted from said LED light source is focused to said second focal region,
the reflector axis of said reflector being defined through said first focus and at least a portion of said second focal region.

6. Lighting device according to claim 5, wherein
said shield is arranged within said second focal region of said reflector.

7. Lighting device, comprising at least
an LED light source,
a concave reflector comprising a reflector axis, said LED light source being arranged to emit light to be reflected by said reflector,
a shield being arranged in front of said reflector,
a projection lens being arranged to project light passing said shield, said projection lens comprising an optical axis,
wherein the reflector axis is inclined relative to the optical axis
wherein said LED light source is arranged below the optical axis,
wherein said shield comprises an upper edge to cut off a portion of said light reflected by said reflector,
wherein the upper edge of the shield is provided with a first portion, which first portion is horizontal in the direction of the optical axis, and a second portion, which second portion is slightly inclined in the direction of the optical axis,
wherein the second portion of the shield is located between the LED light source and the first portion, and
wherein at least a portion of said shield is arranged within a focus of said projection lens.

8. Lighting device, comprising at least
an LED light source,
a concave reflector comprising a reflector axis, said LED light source being arranged to emit light to be reflected by said reflector,
a shield being arranged in front of said reflector,
a projection lens being arranged to project light passing said shield, said projection lens comprising an optical axis,
wherein the reflector axis is inclined relative to the optical axis
wherein said LED light source is arranged below the optical axis,
wherein said shield comprises an upper edge to cut off a portion of said light reflected by said reflector, wherein the upper edge of the shield is provided with a first portion, which first portion is horizontal in the direction of the optical axis, and a second portion, which second portion is slightly inclined in the direction of the optical axis, wherein the second portion of the shield is located between the LED light source and the first portion, and wherein said reflector is shaped as a half dome arranged above said LED light source.

9. Lighting device, comprising at least an LED light source, a concave reflector comprising a reflector axis, said LED light source being arranged to emit light to be reflected by said reflector, a shield being arranged in front of said reflector, a projection lens being arranged to project light passing said shield, said projection lens comprising an optical axis, wherein the reflector axis is inclined relative to the optical axis wherein said LED light source is arranged below the optical axis, wherein said shield comprises an upper edge to cut off a portion of said light reflected by said reflector, wherein the upper edge of the shield is provided with a first portion, which first portion is horizontal in the direction of the optical axis, and a second portion, which second portion is slightly inclined in the direction of the optical axis, wherein the second portion of the shield is located between the LED light source and the first portion, and wherein said LED light source is arranged on a flat surface arranged inclined relatively to said optical axis of said projection lens.

10. Lighting device, comprising at least an LED light source, a concave reflector comprising a reflector axis, said LED light source being arranged to emit light to be reflected by said reflector, a shield being arranged in front of said reflector, a projection lens being arranged to project light passing said shield, said projection lens comprising an optical axis, wherein the reflector axis is inclined relative to the optical axis wherein said LED light source is arranged below the optical axis, wherein said shield comprises an upper edge to cut off a portion of said light reflected by said reflector, wherein the upper edge of the shield is provided with a first portion, which first portion is horizontal in the direction of the optical axis, and a second portion, which second portion is slightly inclined in the direction of the optical axis, wherein the second portion of the shield is located between the LED light source and the first portion, and wherein said reflector or said LED light source are mounted on a heat sink body.

11. Vehicle headlight comprising a lighting device having at least:

an LED light source, a concave reflector comprising a reflector axis, said LED light source being arranged to emit light to be reflected by said reflector, a shield being arranged in front of said reflector, a projection lens being arranged to project light passing said shield, said projection lens comprising an optical axis, wherein the reflector axis is inclined relative to the optical axis wherein said LED light source is arranged below the optical axis, wherein said shield comprises an upper edge to cut off a portion of said light reflected by said reflector, wherein the upper edge of the shield is provided with a first portion, which first portion is horizontal in the direction of the optical axis, and a second portion, which second portion is slightly inclined in the direction of the optical axis, and wherein the second portion of the shield is located between the LED light source and the first portion.

12. Lighting device according to claim 2, wherein the center of the upper edge of the shield is defined by the first and second portion of the shield.

13. Lighting device according to claim 2, wherein said shield axis is arranged at an angle of 5°-25° relatively to said optical axis of said projection lens.

* * * * *